United States Patent [19]
Won

[11] Patent Number: 5,495,966
[45] Date of Patent: Mar. 5, 1996

[54] FLUID CONTAINER PLUG

[76] Inventor: Jea-Don Won, 19-902 Shindong-a Apartment, Hak-ik 5-Dong, Nam-gu, Inch'on, Rep. of Korea

[21] Appl. No.: 293,371

[22] Filed: Aug. 18, 1994

[30]  Foreign Application Priority Data

Sep. 2, 1993 [KR] Rep. of Korea ............... 1993-17397

[51] Int. Cl.⁶ .................................................. B65D 51/00
[52] U.S. Cl. .................. 222/508; 222/518; 222/545; 222/563; 220/714; 220/715; 251/107; 251/297
[58] Field of Search .................... 222/509, 518, 222/545, 563, 559, 508; 215/311, 315, 387; 220/373, 374, 256, 714, 715; 251/297, 107

[56]  References Cited

U.S. PATENT DOCUMENTS

| | | | |
|---|---|---|---|
| 616,629 | 12/1898 | O'Lally | 251/107 |
| 927,593 | 7/1909 | Phillipson | 251/107 |
| 1,402,604 | 1/1922 | Harvey | 222/509 |
| 4,960,218 | 10/1990 | Toida et al. | 215/315 |
| 5,197,515 | 3/1993 | Saville et al. | 222/545 |
| 5,294,091 | 3/1994 | van Eck | 251/107 |
| 5,392,967 | 2/1995 | Satomi et al. | 222/563 |

FOREIGN PATENT DOCUMENTS 5-95437  12/1993  Japan .

*Primary Examiner*—William A. Cuchlinski, Jr.
*Assistant Examiner*—Lisa Douglas
*Attorney, Agent, or Firm*—Christie, Parker & Hale

[57]  ABSTRACT

A fluid container plug is disclosed in which, if a button of the plug is pressed, the content of the container can be discharged by inclining the container, and if another button is pressed, the container is locked shut, so that the container can be manipulated in a one touch manner, thereby making the use of the container convenient. The fluid container plug according to the present invention includes an outer casing with its upper and lower ends open, an inner casing installed within the outer casing keeping a gap with the outer casing; a discharge path formed through the lower open portion of the outer casing and along the gap through which the content of the container is discharged. An opening/closing member is installed within the inner casing in a reciprocating manner to open and close the lower opening portion of the outer casing.

8 Claims, 3 Drawing Sheets

FLUID CONTAINER PLUG

FIELD OF THE INVENTION

The present invention relates to a fluid container plug, and particularly to an improvement of the plug of a thermos or other fluid containers, in which, if a button of the plug is pressed, the content of the container can be discharged by inclining the container, and if another button is pressed, the container is locked, so that the container can be manipulated in a one touch manner, thereby making the use of the container convenient.

BACKGROUND OF THE INVENTION

Conventionally, the mouth of a thermos or other fluid containers is firmly press-fitted with a plug for preserving the warmth or for preventing leakage of the content. If the content is to be discharged, the plug has to be detached from the container by turning it. However, such a conventional container is accompanied with an inconvenience of detaching the plug from the container each time it is used.

Meanwhile, there is a method in which the plug is released to open the whole or a part of the discharge hole for overcoming the above described inconvenience. In this method, however, the direction of the discharge hole has to be checked before discharging the content, and if it is not checked, the contents may spill. Further, in this method also, the plug can be opened only by turning it, and therefore, the plug has to be fitted firmly. Therefore, turning the press-fitted plug is very inconvenient.

SUMMARY OF THE INVENTION

The present invention is intended to overcome the above described disadvantages of the conventional techniques.

Therefore it is the object of the present invention to provide a fluid container plug in which a one touch method is used in discharging or locking the content of the container or in carrying out other functions, so that it is convenient for the user.

In achieving the above object, the fluid container plug according to the present invention includes: an outer casing with threads formed on its circumference for coupling with the mouth of a container, and with its upper and lower ends open; an inner casing installed within the outer casing keeping a gap with the outer casing; a discharge path formed through the lower open portion of the outer casing and along the gap; an opening/closing member installed within the inner casing in a reciprocating manner, its lower end being provided with a lead for opening or closing the lower opening portion of the outer casing, and its upper end extending into the inner casing; one or a plurality of pressure setting springs for elastically biasing the opening/closing member relative to the inner casing so as for the lead of the opening/closing member to be positioned to close the lower opening portion; a projecting portion formed on a swinging member hinge-coupled with the inner casing, contacting with the upper portion of the opening/closing member, and formed on the lower portion of the swinging member for pressing down the upper portion of the opening/closing member during the swinging of the swinging member; two push buttons installed on the upper portion of the inner casing; and two actuation rods extending from the two push buttons to be connected to the opposite sides of the swinging member.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
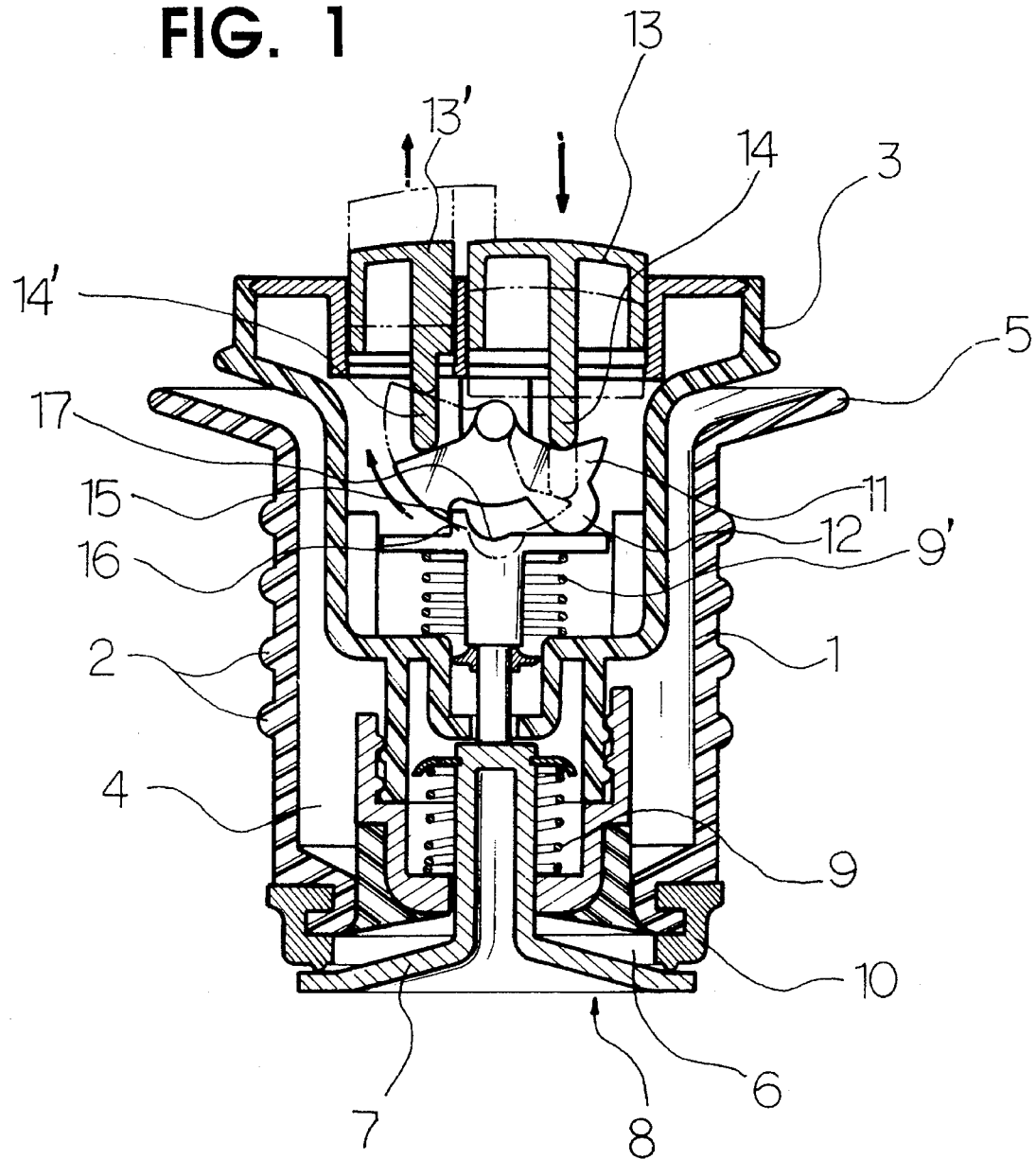
FIG. 1 is a longitudinal sectional view of the device of the present invention.
Figure 2:
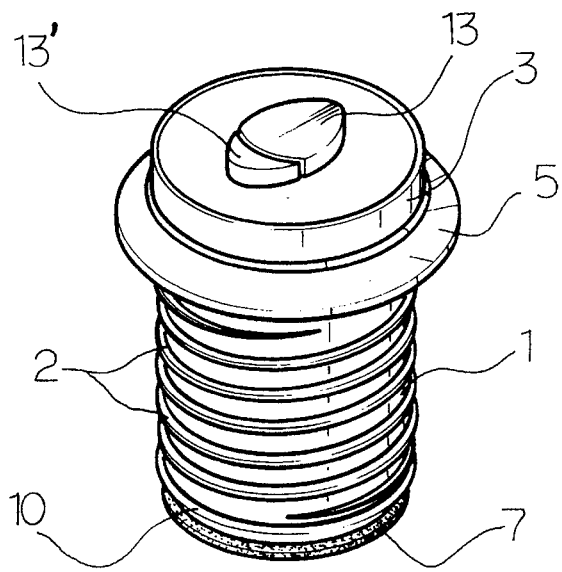
FIG. 2 is a perspective view of the device of the present invention.

As shown in FIGS. 1 and 2, a cylindrical outer casing 1 is provided with threads 2 on the circumferential surface thereof for being threadably coupled with the mouth of a container. An inner casing 3 is installed within the outer casing 1 keeping a certain gap from it. The upper and lower ends of the outer casing 1 are open, and a discharge path 4 is formed along the gap between the inner and outer bodies 3 and 1. On the upper portion of the outer casing 1, there is formed a projecting rim 5. Therefore, the content of the container pass through an opening portion 6 of the lower portion of the outer casing 1 and the discharge path 4 to be discharged to the outside of the container through the projecting rim 5. Meanwhile, an opening/closing member 8 which has a lead 7 for opening and closing the opening portion 6 of the lower portion of the outer casing 1 is installed reciprocatingly relative to the inner casing 3. Pressure setting springs 9 and 9' which are for elastically biasing the opening/closing member 8 relative to the inner casing 3 are installed in such a manner that the initial position of the opening/closing member 8 should close the opening portion 6.

A sealing member 10 is disposed between the opening/closing member 8 and the outer casing 1. Meanwhile, a sector shaped swinging member 11 is hinge-coupled with the inner casing 3, and this swinging member 11 contacts with the upper portion of the opening/closing member 8 of the interior of the inner casing 3, and is capable of swinging within a certain angular range. The swinging member 11 is provided with a projecting portion 12 which is projected outwardly so as to be contacted with the opening/closing member 8. Two push buttons 13 and 13' are installed on the upper portion of the inner casing 3, which is projected outward over the top of the outer casing 1. The push buttons 13 and 13' are provided with actuation rods 14 and 14' which extend downward to be coupled with the opposite sides of the swinging member 11.

Preferably an engaging protuberance 16 is formed on a side of the top of the opening/closing member 8, and an engaging step 15 is formed on the swinging member 11.

Preferably, a recess 17 is formed at the middle of the top of the opening/closing member, so that the projecting portion 12 of the swinging member 11 should be placed in the recess 17.

Figure 1A:
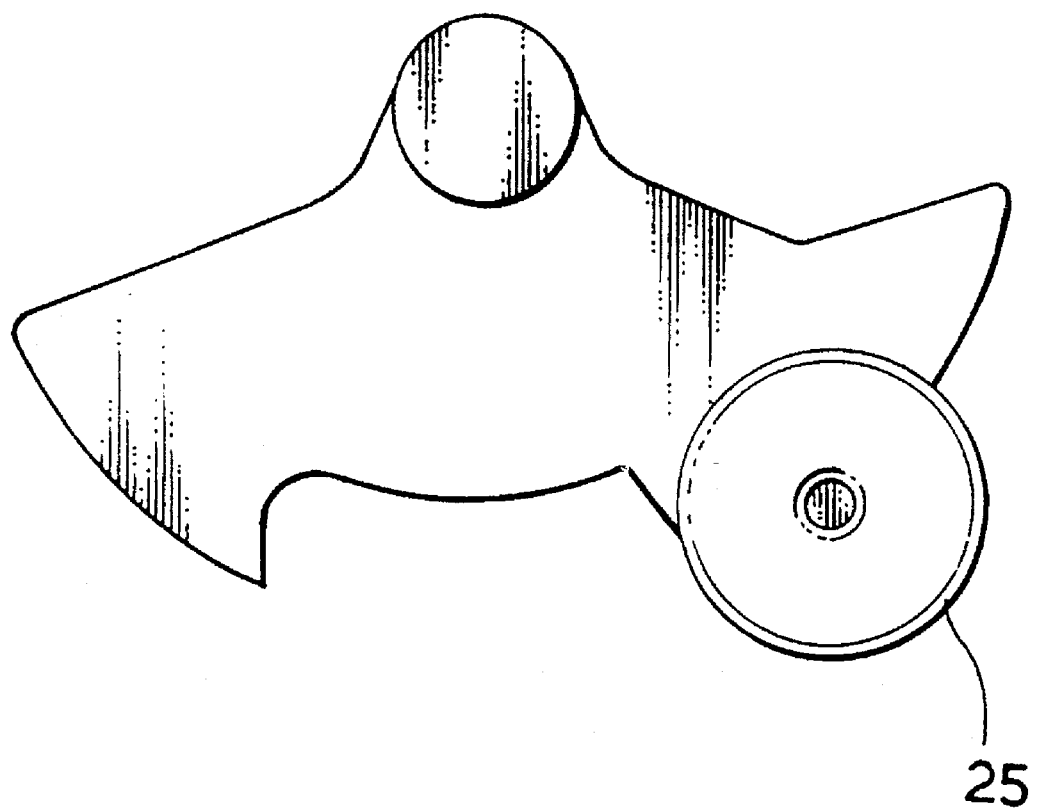
FIG. 1a is an elevational view of an alternate embodiment of the swinging member having a roller.

Preferably, a roller 25, as shown in FIG. 1a, may be installed on the projecting portion 12 of the swinging member 11, so that, when the push buttons 13 and 13' are pressed, less force should be required.

The operation of the device of the present invention constituted as shown above will now be described as to its operation.

Figure 3:
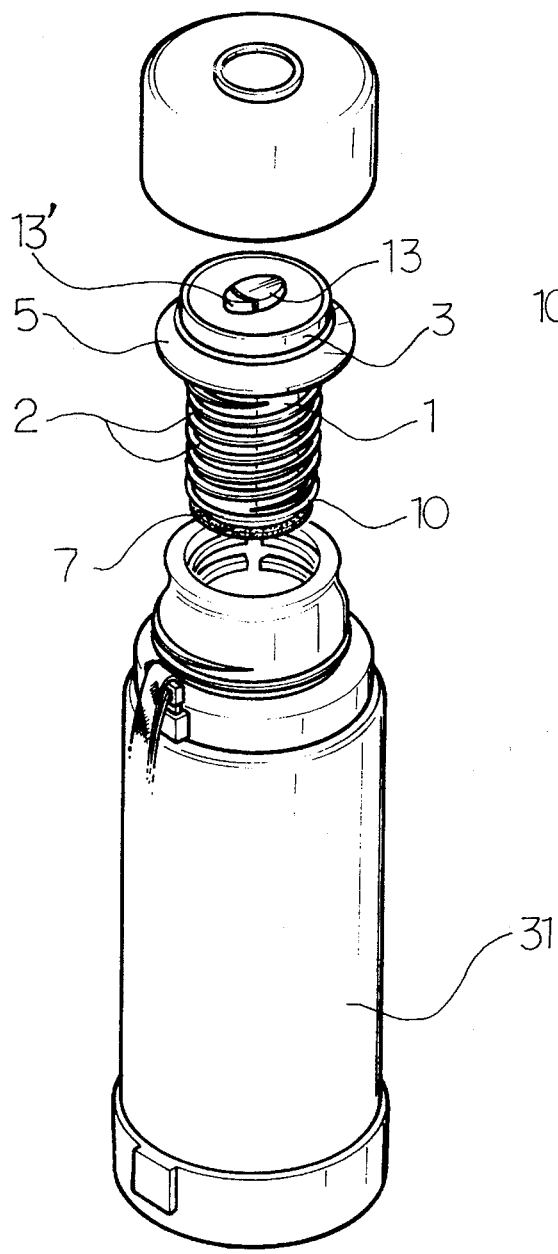
FIG. 3 is an exploded perspective view showing the use of the device of the present invention.

As shown in FIG. 3, the plug of the present invention is fitted to a fluid container 31, and is threadably coupled with the latter, At the initial position, the opening/closing member closes the opening portion of the lower portion of the outer casing, so that the content of the container cannot be discharged to the outside. If one of the two push buttons is pressed, the actuation rod of the push button makes the swinging member swing. Then the projecting portion of the swinging member presses the opening/closing member down against the force of the pressure setting spring, with the result that the lead of the opening/closing member opens the opening portion which is formed on the lower end of the outer casing. In this position, if the container is inclined, the content of the container is discharged to the outside. Meanwhile, if the other push button is pressed, the swinging member is swung in the opposite direction, in such a manner that the swinging member is pivoted until the engaging step is engaged with the engaging protuberance of the opening/closing member. Under this condition, the opening/closing member is restored to the original position by the pressure setting spring, with the result that the lead of the opening/closing member closes the opening portion of the outer casing. Therefore, the content of the container cannot be discharged to the outside.

According to the present invention as described above, the functions such as discharge of the content and the locking of the container are carried out in a one touch manner. Therefore, the convenience of the user is greatly promoted, and the plug does not need to be detached until the container is refilled, with the result that the heat preserving effect is promoted.

What is claimed is:

1. A fluid container plug comprising:

an outer casing with threads formed on its circumference for coupling with the mouth of a container, and with its upper and lower ends open;

an inner casing installed within the outer casing keeping a gap with said outer casing;

a discharge path formed through the lower open portion of said outer casing and along said gap;

an opening/closing member installed within said inner casing in a reciprocating manner, its lower end being provided with a lead for opening or closing the lower opening portion of said outer casing, and its upper end extending into said inner casing;

one or a plurality of pressure setting springs for elastically biasing said opening/closing member relative to the inner casing so as for the lead of the opening/closing member to be positioned to close the lower opening portion;

a swinging member hinge-coupled with said inner casing, and provided with a projecting portion, said projecting portion contacting with the upper portion of said opening/closing member for pressing down the upper portion of said opening/closing member during the swinging of the swinging member;

two push buttons installed on the upper portion of said inner casing; and two actuation rods extending from said two push buttons to be connected to the opposite sides of said swinging member.

2. The fluid container plug as claimed in claim 1, wherein a roller is installed on said projecting portion of said swinging member.

3. The fluid container plug of claim 1 further comprising a sealing member interposed between the outer casing and the reciprocating member whereby the reciprocating member is sealed against the outer case.

4. A fluid container plug comprising:

an outer casing adapted to couple with a mouth of a container and having an open upper end and an open lower end;

an inner casing within the outer casing defining a gap between the outer casing and the inner casing;

a discharge path comprising the lower open end of the outer casing and the gap:

a reciprocating member reciprocating installed within the inner casing having a lower end for opening and closing the discharge path and an upper end extending into the inner casing;

at least one spring acting on the reciprocating member to bias the reciprocating member toward the closed position; and a swinging member hingably attached to the inner casing and having a projecting portion whereby a force applied to the swinging member rotates the projection portion to engage and force the reciprocating member to open the lower opening portion.

5. The fluid container plug according to claim 4 further comprising at least one push button attached to the upper portion of the inner casing whereby the force is applied to the swinging member.

6. The fluid container plug according to claim 5 further comprising at least one actuation rod extending from the at least one push button to the swinging member whereby the force is applied to the swinging member.

7. The fluid container plug according to claim 4 comprising a roller rotatably attached on the projecting portion of the swinging member for reducing the force required to open the lower opening portion.

8. The fluid container plug according to claim 4 wherein the gap is circumferential about the plug whereby the contents of the container can be discharged at any point around the circumference of the plug.

* * * * *